Patented May 15, 1951

2,552,684

UNITED STATES PATENT OFFICE

2,552,684

PROCESS FOR PRODUCING DRYING OIL FROM UNSATURATED GLYCERIDES, CONJUGATED DIOLEFINS, AND HYDROCARBON POLYMERS

Edwin G. Marhofer, Lawrence, Kans., assignor to Phillips Petroleum Company, a corporation of Delaware No Drawing. Application November 7, 1947, Serial No. 784,761

10 Claims. (Cl. 260—23)

This invention relates to the production of drying oils. In one embodiment it relates to a process for the production of drying oils by condensation of an open chain conjugated olefinic material with an unsaturated glyceride-clay-tower polymer mixture. In one specific embodiment this invention relates to the production of a drying oil by the condensation of butadiene with a mixture of an unsaturated glyceride and polymers produced from the clay treatment of cracked petroleum naphthas.

The use of glyceride oils, typified by tung or China-wood oil, in the manufacture of paints, varnishes, floor coverings, and the like has long been known and practiced in the art. These oils, known as drying oils possess the ability when exposed on a surface to air, to form tough and durable films. Linseed oil, the most widely used of the drying oils, dries slowly unless subjected to special treatment, such as boiling, air-blowing, the use of chemical additives known as driers, and the like. Soybean oil, corn oil, cottonseed oil and other semi-drying oils which are abundantly available from domestic sources are extremely slow in drying and as a result have found but limited use in the production of protective coating materials. Clay-tower polymer produces a very brittle and non-permanent film on air drying.

More recently the lower boiling fractions of the polymers obtained from the clay treatment of cracked gasolines have been utilized to some extent in low grade paints and coatings. Here again however, as in the case of the slow drying vegetable oils, the slow-drying properties of this material have greatly limited its use in the production of protective coating materials.

In the past certain processes have been developed for the condensation of unsaturated glyceride oils of the drying or semi-drying type with cyclic diolefins such as cyclopentadiene for the purpose of improving their drying characteristics. However, cyclopentadiene is usually not readily available other than in a polymeric form such as the dimer, trimer, tetramer, and higher polymers, from which it is obtained only after expensive cracking operations or other laborious processes.

I have now discovered that when unsaturated glyceride oils are mixed with petroleum derived polymers such as clay-tower polymers or the like and the mixture condensed with open chain conjugated olefinic material coating compounds having superior drying properties are obtained. In the preparation of my product, the clay-tower polymer-glyceride oil mixture is commingled with an open chain conjugated diolefin or triolefin under conditions such that condensation of the diolefin or triolefin with the said clay-tower polymer and glyceride oil constitutes the principal reaction.

The materials thus obtained have drying properties much superior to either of the starting materials or any mixture thereof. For example, a blend of soybean oil and clay-tower polymer when condensed with butadiene produces a compound possessing drying properties similar to those of linseed oil.

Thus semi-drying oils, such as clay-tower polymer, soybean oil, corn oil, and the like, ordinarily considered to have only limited utility in the field of protective coatings, are employed in the preparation of a product which provides excellent finishes as the result of air drying or baking.

An object of this invention is to provide a new type drying oil.

Another object is to provide a process for producing drying oils.

Still another object is to produce a drying oil using an open chain conjugated olefinic material, an unsaturated glyceride oil and clay-tower polymers as starting materials.

Another object is to produce a drying oil using an unsaturated glyceride oil, clay-tower polymers and an open chain conjugated diolefin as starting materials.

Another object is to produce a drying oil by condensing a mixture of an unsaturated glyceride oil and clay-tower polymers with an open chain conjugated triolefin.

Still another object is to produce a drying oil by condensing a mixture of soybean oil and clay-tower polymers with butadiene.

Still another object is to produce a drying oil by condensing a mixture of linseed oil and clay-tower polymers with butadiene.

Other objects and advantages of this invention will be obvious to one skilled in the art from the accompanying disclosure and discussion.

In the process of my invention the oil is blended with clay-tower polymer in a ratio of from 0.5 to 4.0 parts by weight of oil to one part by weight of clay-tower polymer. This blend is then admixed with 5 to 40 percent by weight of a suitable open chain conjugated olefinic material, such as butadiene, in a pressure reactor which is sealed and heated to from about 200 to about 350° F. for a period of from about two to about twenty hours, preferably from about five to about fifteen hours. The pressure in the reactor depends upon several factors, such as the particular temperature employed, olefinic material used and the ratio of the mixture of glyceride oil and clay-tower polymers to the particular olefinic material employed. The pressure employed is not critical, but usually a pressure sufficient to maintain a liquid phase in the reaction zone is preferred. At the end of this period the unreacted olefinic material is vented into a condenser from which it is returned to storage for other use or for recycling. Small amounts of dimer which may have been formed may conveniently be removed at the stage in the process by distillation directly from the reaction chamber. If desired the dimer may be removed after the stabilizing period immediately prior to bodying the oil. The reactor is then resealed and the temperature elevated slowly to the range between about 350 to about 600° F. While at temperatures between about 350 and about 500° F. changes are effected in the condensate whereby the open chain conjugated olefinic material, glyceride oil, and petroleum polymer fraction become more firmly bound together. Bodying to the desired viscosity is effected in the range between 550 and 600° F. The time required for the elevated temperature treatment of the condensate will usually be from about one to about ten hours, but preferably from about 2 to about 6 hours.

The products of my invention can be prepared employing a wide variety of abundant and readily available starting materials. Petroleum derived polymers are produced in large quantities as a by-product in gasoline manufacture. These can be combined with unsaturated glyceride oils of the drying and semi-drying type such as linseed oil, soybean oil, cottonseed oil, fish oil, and the like. The open chain conjugated olefinic material referred to in this specification and claims which may be employed in my process include those open chain olefinic materials which have at least four and not more than ten carbon atoms per molecule, and which contain at least two and not more than three ethylenic linkages per molecule, for example, butadiene, isoprene, piperylene, hexatriene and similar substances; I generally prefer, however, to employ butadiene due to its being more readily available from abundant sources, notably the $C_4$ streams from petroleum refining. The clay-tower polymers may be obtained from any suitable and convenient source. My process may be carried out either in a batch or in a continuous manner.

TEST METHODS USED IN THE FOLLOWING EXAMPLES 100 grams of oil was dissolved in 60 grams of Varnish Makers' & Painters' Naphtha. To this was added cobalt and lead driers (naphthenates or linoleates) in the amount to provide 0.024 percent cobalt and 0.048 percent lead. The oil was then stirred thoroughly and spread on glass test plates in uniform layers and exposed to the air at room temperature. "Set dry" is the time required for the formation of a film which is sticky to the fingers but is not removed in contact. "Rub dry" is the time required at which the film is not broken upon rubbing, although still sticky. "Final dry" is the time required for the formation of a film which when pressed firmly with the fingers and then polished, leaves no prints. The standard method for determining iodine number was used.

*Example I*

A 1000 cc. steel bomb was charged with a mixture consisting of 250 grams of soybean oil and 250 grams of clay-tower polymer. Butadiene was then added in the amount of 116 grams and the bomb sealed. The temperature was then raised to 200° F. and maintained between 200 and 350° F. for 8 hours. The bomb was then cooled and the unreacted butadiene vented to a condensing trap. A total of 55 grams of butadiene was recovered in this manner.

After venting off the butadiene, the bomb was resealed and the condensate was bodied to a (Gardner-Holdt) viscosity Z-2 by elevating the temperature to 580–590° F. for one hour. A yield of 470 grams of material was obtained which produced a very tough, hard film upon air drying. Comparison of the drying of this product with soybean oil and clay-tower polymer are shown in Table I.

TABLE I

| | Soybean oil, Clay-tower polymer, Butadiene condensate | Soybean oil | Clay-tower polymer |
|---|---|---|---|
| Set Dry ........ Hours.. | 7 | 48 | 6 |
| Rub Dry ........ do.... | 9 | | 15 |
| Final Dry ........ do.... | 30 | | 35 |

*Example II*

A 400 cc. steel bomb was charged with a mixture consisting of 60 grams of linseed oil and 60 grams of clay-tower polymer. Fifty-three and five-tenths grams of butadiene were added and the bomb sealed. The temperature was then raised to and maintained at between 250 and 350° F. over a period of 16 hours. One gram of unreacted butadiene was recovered after cooling.

After venting off the unreacted butadiene, the bomb was unsealed and the condensate was bodied to Z-3 viscosity (Gardner-Holdt) by heating at 590 to 600° F. for one hour. A yield of 131 grams of oil was obtained with the properties shown in Table II.

TABLE II

| | Linseed oil, clay-tower polymer, butadiene condensate | Bodied Linseed Control |
|---|---|---|
| Set Dry ........................ Hours.. | 4.0 | 2.6 |
| Rub Dry ........................ do.... | 10.0 | 4.5 |
| Final Dry ........................ do.... | 19.0 | 22.5 |
| Iodine Number ........................ | 143.6 | .......... |

It is to be understood that this invention should not be unnecessarily limited to the above discussion and description and that modifications and variations may be made without departing from the invention or from the scope of the claims.

I claim:

1. A process for condensation of a mixture of linseed oil and polymer produced by clay treatment of cracked gasoline with butadiene, which comprises reacting a mixture comprising from about 0.5 to about 4.0 parts by weight of linseed oil to one part by weight of said polymer with from about 5 to about 40 percent by weight of butadiene based on the weight of said linseed oil-polymer mixture in a reaction zone maintained at a temperature in the range between about 200 and about 350° F. and under a pressure sufficient to maintain a liquid phase for a period of time in the range between about 5 to about 15 hours; treating a resulting reaction mixture comprising condensation product of said linseed oil-polymer mixture and butadiene at a temperature in the range between about 350 and about 600° F. for a period of time from about two to about six hours whereby the said condensation product is stabilized and bodied.

2. A process for condensation of a mixture of linseed oil and polymer produced by clay treatment of cracked gasoline with butadiene, which comprises reacting a mixture comprising from about 0.5 to about 4.0 parts by weight of linseed oil to one part by weight of said polymer with from about 5 to about 40 percent by weight of butadiene based on the weight of said linseed oil-polymer mixture in a reaction zone maintained at a temperature in the range between about 200 and about 350° F. and under a pressure sufficient to maintain a liquid phase for a period of time in the range between about 3 to about 20 hours; treating a resulting reaction mixture comprising condensation product of said linseed oil-polymer mixture and butadiene at a temperature in the range between about 350 and about 600° F. for a period of time from about 1 to about 10 hours whereby the said condensation product is stabilized and bodied.

3. A process for condensation of a mixture of linseed oil and polymer produced by clay treatment of cracked gasoline with isoprene, which comprises reacting a mixture comprising from about 0.5 to about 4.0 parts by weight of linseed oil to one part by weight of said polymer with from about 5 to about 40 percent by weight of isoprene based on the weight of said linseed oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said linseed oil-polymer mixture and isoprene at a temperature in the range between about 350 and about 600° F. for a period of time from about 1 to about 10 hours whereby the said condensation product is stabilized and bodied.

4. A process for condensation of a mixture of linseed oil and polymer produced by clay treatment of cracked gasoline with hexatriene, which comprises reacting a mixture comprising from about 0.5 to about 4.0 parts by weight of linseed oil to one part by weight of said polymer with from about 5 to about 40 percent by weight of hexatriene based on the weight of said linseed oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said linseed oil-polymer mixture and hexatriene at a temperature in the range between about 350 and about 600° F. for a period of time from about 1 to about 10 hours whereby the said condensation product is stabilized and bodied.

5. A process for condensation of a mixture of soybean oil and polymer produced by clay treatment of cracked gasoline with butadiene, which comprises reacting a mixture comprising from about 0.5 to about 4.0 parts by weight of soybean oil to one part by weight of said polymer with from about 5 to about 40 percent by weight of butadiene based on the weight of said soybean oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said soybean oil-polymer mixture and butadiene at a temperature in the range between about 350 and about 600° F. for a period of time from about 1 to about 10 hours whereby the said condensation product is stabilized and bodied.

6. A process for condensation of a mixture of an unsaturated glyceride oil and polymer produced by clay treatment of cracked gasoline with an open chain conjugated diolefin, which comprises reacting a mixture comprising from about 0.5 to about 4.0 parts by weight of said unsaturated glyceride oil to one part by weight of said polymer with from about 5 to about 40 percent by weight of said conjugated diolefin based on the weight of said glyceride oil-polymer mixture in a reaction zone maintained at a temperature in the range between about 200 and 350° F. and under a pressure sufficient to maintain a liquid phase for a period of time in the range between about 2 to about 20 hours; treating a resulting reaction mixture comprising condensation product of said unsaturated glyceride oil-polymer mixture and said conjugated diolefin at a temperature in the range between about 350 and about 600° F. for a period of time from about 1 to about 10 hours whereby the said condensation product is stabilized and bodied.

7. A process for condensation of a mixture of an unsaturated glyceride oil and polymer produced by clay treatment of cracked gasoline with an open chain conjugated triolefin, which comprises reacting a mixture comprising from about 0.5 to about 4.0 parts by weight of said unsaturated glyceride oil to one part by weight of said polymer with from about 5 to about 40 percent by weight of said conjugated triolefin based on the weight of said glyceride oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said unsaturated glyceride oil-polymer mixture and butadiene at a temperature in the range between about 350 and about 600° F. for a period of time from about 1 to about 10 hours whereby the said condensation product is stabilized and bodied.

8. A process for condensation of a mixture of an unsaturated glyceride oil and polymer produced by clay treatment of cracked gasoline with an acyclic hydrocarbon selected from the group consisting of a conjugated diolefin and a conjugated triolefin, which comprises reacting a mixture comprising from about 0.5 to about 4.0 parts by weight of said unsaturated glyceride oil to one part by weight of said polymer with from about 5 to about 40 percent by weight of said acyclic hydrocarbon based on the weight of said glyceride oil-polymer mixture in a reaction zone maintained at a temperature in the range between about 200 and about 350° F. and under a pressure sufficient to maintain a liquid phase for a period of time in the range between about 5 to about 15 hours; treating a resulting reaction mixture comprising condensation product of said glyceride oil-polymer mixture and said acyclic hydrocarbon at a temperature in the range between about 350 and about 600° F. for a period of time from about two to about six hours whereby the said condensation product is stabilized and bodied.

9. A process for condensation of a mixture of an unsaturated glyceride oil and polymer produced by clay treatment of cracked gasoline with an acyclic hydrocarbon selected from the group consisting of a conjugated diolefin and a conjugated triolefin, which comprises reacting a mixture comprising from about 0.5 to about 4.0 parts by weight of said unsaturated glyceride oil to one part by weight of said polymer with from about 4 to about 40 percent by weight of said acyclic hydrocarbon based on the weight of said glyceride oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said glyceride oil-polymer mixture and said acyclic hydrocarbon at a temperature in the range between about 350 and about 600° F. for a period of time from about 1 to about 10 hours whereby the said condensation product is stabilized and bodied.

10. A process for condensation of a mixture of cottonseed oil and polymer produced by clay treatment of cracked gasoline with piperylene, which comprises reacting a mixture comprising from about 0.5 to about 4.0 parts by weight of cottonseed oil to one part by weight of said polymer with from about 5 to about 40 percent by weight of piperylene based on the weight of said cottonseed oil-polymer mixture in a reaction zone maintained at a temperature in the range between about 200 and about 350° F. and under a pressure sufficient to maintain a liquid phase for a period of time in the range between about 2 to about 20 hours; treating a resulting reaction mixture comprising condensation product of said cottonseed oil-polymer mixture and piperylene at a temperature in the range between about 350 and about 600° F. for a period of time from about 1 to about 10 hours whereby the said condensation product is stabilized and bodied.

EDWIN G. MARHOFER.

REFERENCES CITED

The following references are of record in the file of this patent:

UNITED STATES PATENTS

| Number | Name | Date |
|---|---|---|
| 2,035,455 | Bjerregaard | Mar. 31, 1936 |
| 2,370,689 | Rummelsburg | Mar. 6, 1945 |

FOREIGN PATENTS

| Number | Country | Date |
|---|---|---|
| 138,046 | Great Britain | Jan. 29, 1920 |